United States Patent
Shaffer et al.

(10) Patent No.: US 7,035,230 B1
(45) Date of Patent: Apr. 25, 2006

(54) SYSTEM AND METHOD FOR BANDWIDTH AND CONFERENCE RESOURCE RESERVATION

(75) Inventors: Shmuel Shaffer, Palo Alto, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 867 days.

(21) Appl. No.: 09/902,946

(22) Filed: Jul. 11, 2001

(51) Int. Cl.
*H04L 12/16* (2006.01)

(52) U.S. Cl. .................................... 370/261; 370/395.4
(58) Field of Classification Search ................ 370/260, 370/261, 262, 263, 265, 270, 401, 204, 311, 370/386, 389, 390, 395.21, 395.3, 395.4; 379/93.21, 159, 202.01; 709/204
See application file for complete search history.

(56) References Cited

U.S. PATENT DOCUMENTS

| | | | |
|---|---|---|---|
| 5,483,587 A | 1/1996 | Hogan et al. | 379/202 |
| 5,491,797 A * | 2/1996 | Thompson et al. | 709/204 |
| 5,546,449 A | 8/1996 | Hogan et al. | 379/202 |
| 5,903,637 A | 5/1999 | Hogan et al. | 379/203 |
| 6,282,278 B1 | 8/2001 | Doganata et al. | 379/202 |
| 6,324,169 B1 | 11/2001 | Roy | 370/260 |
| 6,441,605 B1 * | 8/2002 | Baurand et al. | 324/127 |

* cited by examiner

*Primary Examiner*—Brenda Pham
(74) *Attorney, Agent, or Firm*—Baker Botts L.L.P.

(57) ABSTRACT

A system and method for reserving a network resource for a multipoint conference includes receiving a list of participants scheduled to participate in the conference, a scheduled start time, and estimated duration for the conference. A plurality of communication paths are predicted, each communication path corresponding to at least one of the participants. A network resource along the communication paths is reserved for a predetermined period of time beginning at approximately the scheduled start time. In accordance with the particular embodiment, the network resource includes bandwidth.

21 Claims, 3 Drawing Sheets

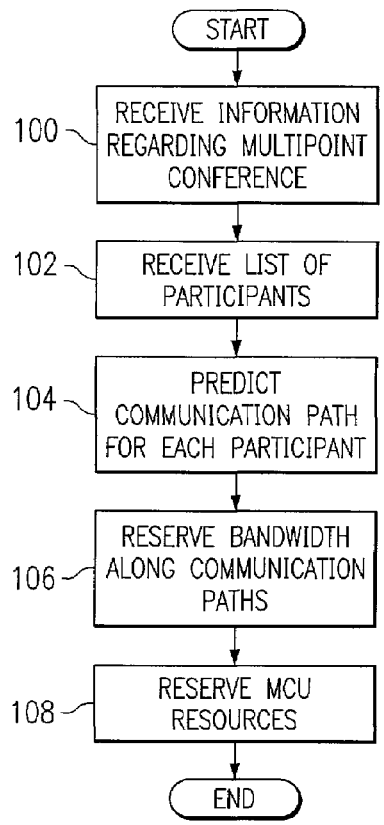
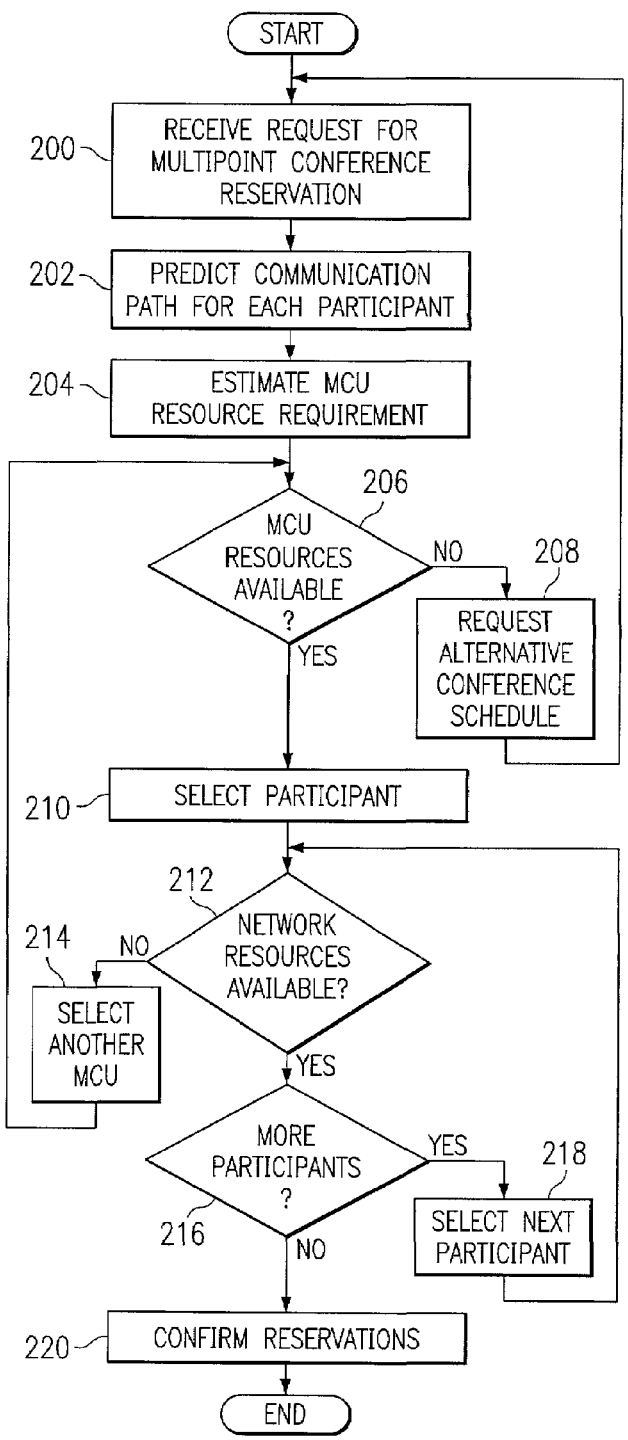

| SESSION ID 302 | MCU ADDRESS (PORTS/DSP RESOURCES RESERVED) 308 | REQUESTOR ID 310 | PARTICIPANTS 312 | PRIORITY/ CONFIRMED? 314 | START 316 | END 318 | TYPE 320 | QoS (1–10) 322 | BANDWIDTH (Kbps) 324 | BANDWIDTH RESERVED 326 |
|---|---|---|---|---|---|---|---|---|---|---|
| N 304 | 452.153.627.189 (5/8MIPs) | L3089 | 973.124.563.079 | HIGH/YES | 7/12/01 10:30 A.M. | 7/12/01 12:30 P.M. | VIDEO | 10011011 | 960 | Y |
| | | | 577.921.199.056 | LOW/NO | | | AUDIO | | 160 | N |
| | | | 977.021.577.002 | LOW/YES | | | VIDEO | | 1120 | N |
| | | | 132.769.778.653 | MED/YES | | | AUDIO | | 3120 | Y |
| | | | 981.113.275.921 | HIGH/NO | | | VIDEO | | 240 | N |
| N+1 305 | 546.987.763.331 (3/5MIPs) | L5062 | 192.368.572.441 | HIGH/YES | 7/13/01 1:00 P.M. | 7/13/01 3:30 P.M. | AUDIO | 01110110 | 80 | Y |
| | | | 267.533.829.763 | LOW/YES | | | AUDIO | | 160 | Y |
| | | | 546.987.763.331 | MED/NO | | | VIDEO | | 160 | Y |
| N+2 306 | 736.418.116.833 (27/10MIPs) | | 977.263.311.189 | HIGH/YES | 7/13/01 8:00 P.M. | 7/13/01 10:00 P.M. | VIDEO | 11110101 | 4560 | Y |
| | | | 622.542.887.621 | HIGH/NO | | | VIDEO | | 2960 | N |
| | | | ... | | | | ... | | ... | |
| | | | 816.933.372.844 | MED/YES | | | AUDIO | | 2800 | Y |

*FIG. 5*

SYSTEM AND METHOD FOR BANDWIDTH AND CONFERENCE RESOURCE RESERVATION

CROSS-REFERENCE TO RELATED APPLICATIONS

This application is filed concurrently with the following commonly owned application: System and Method for Prioritized Bandwidth and Conference Resource Reservation 09/903,162.

TECHNICAL FIELD OF THE INVENTION

The present invention relates generally to network communications, and more particularly, to a system and method for bandwidth and conference resource reservation.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. However, the integration of telecommunications and data transmissions is ongoing, and many features and functionality that were available to users of traditional telecommunications networks have not been made available to users of VoIP and similar technologies.

Traditional communication networks often support multipoint conferences between a number of participants using different communication devices. A multipoint control unit (MCU) is used to couple the devices, which allows users from distributed geographic locations to participate in the conference. Each MCU includes a finite amount of MCU resources to accommodate one or more multipoint conferences, at a given point in time. The conference may be audio only (e.g., teleconference), or videoconferencing/broadcasting may be included. A single MCU may be used to accommodate thousands of participants, in a multipoint conference.

SUMMARY OF THE INVENTION

The present invention solves many of the problems and disadvantages associated with prior communications systems. In a particular embodiment, the present invention provides for future reservation of network and MCU resources for a multipoint conference.

In a particular embodiment, a method for reserving a network resource for a multipoint conference includes receiving a list of participants scheduled to participate in the conference, and a scheduled start time for the conference. A plurality of communication paths are predicted, each communication path corresponding to at least one of the participants. A network resource along the communication paths is reserved for a predetermined period of time beginning at approximately the scheduled start time.

In another embodiment, an address of a host MCU is received by a bandwidth resource management server, and the plurality of communication paths include the addresses of the endpoints. The MCU includes digital signal processor (DSP) resources. At least a portion of the digital signal processor resources are reserved for a predetermined period of time beginning at approximately the scheduled start time.

In yet another embodiment, the MCU includes a plurality of communication ports. A number of the communication ports may be reserved for a predetermined period of time beginning at approximately the scheduled start time.

Technical advantages of particular embodiments of the present invention include a system and method for collecting information regarding the address from which participants of a multipoint conference will communicate with the MCU. Each address may be predicted based upon pre-configured, time-dependent, default addresses. Accordingly, the communication path, and amount of bandwidth required for each segment of each communication path of a multipoint conference may be determined in advance.

Another technical advantage of a particular embodiment of the present invention includes a system and method for verifying the availability of adequate network resources for a multipoint conference. Such network resources include sufficient bandwidth along each segment of a communication path between an endpoint and the MCU. The network resources may also include DSP resources and communication ports associated with the MCU. Accordingly, both bandwidth and MCU resources may be reserved for the multipoint conference. Thus, the participants are ensured that the MCU system will be available to them, and that they will be provided with sufficient network resources to access the MCU.

Yet another technical advantage of particular embodiments of the present invention includes a system and method for automatically locating an MCU having sufficient network resources to host the multipoint conference. Accordingly, an MCU having sufficient DSP resources available, and sufficient bandwidth available in the network for each endpoint to access the MCU and conduct the multipoint conference is identified.

Still another technical advantage of particular embodiments of the present invention includes a system and method for identifying an MCU with insufficient DSP resources and/or insufficient bandwidth available to establish communication paths between the MCU and each endpoint. In such cases, an alternative MCU having sufficient network resources may be identified automatically.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following descriptions, taken in conjunction with the accompanying drawings, in which:

FIG. 2 illustrates a flowchart of a method for reserving conference resources for a multipoint conference;

FIG. 4 illustrates a flowchart of a method for controlling the reservation of MCU and network resources for one or more multipoint conferences.

DETAILED DESCRIPTION OF THE INVENTION

Figure 1:
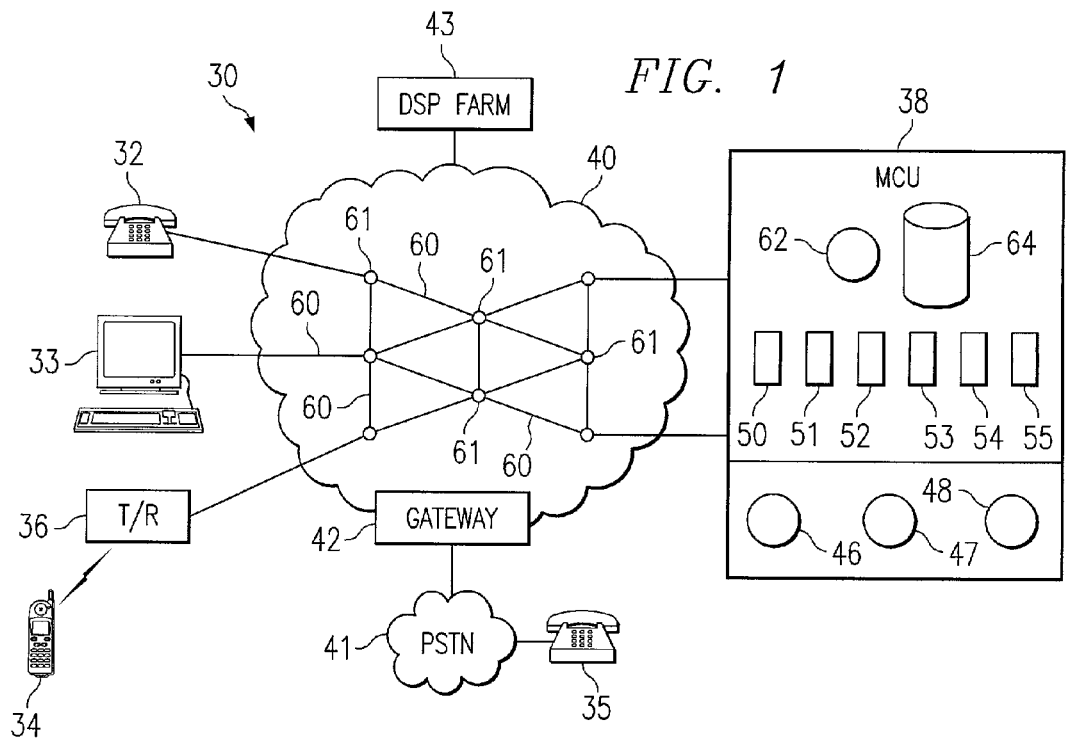
FIG. 1 illustrates one embodiment of a communication system incorporating teachings of the present invention.

FIG. 1 illustrates a communication system 30 including a plurality of endpoints 32–35 having the ability to establish communication sessions with each other, and/or a multipoint control unit (MCU) 38. Such communication sessions may be established using communication networks 40, 41, and/or additional endpoints, components or resources coupled with communication networks 40 or 41. MCU 38 accommodates multipoint conferences between and among endpoints 32–35. MCU 38 includes a plurality of digital signal processors (DSPs) 46–48, and a plurality of communication ports 50–55. Collectively, MCU 38 and communication network 40 include a finite capacity of conference resources that may be allocated to a multipoint conference(s) between a plurality of endpoints 32–35, at any given point in time. In accordance with a particular embodiment of the present invention, a network user may reserve conference resources associated with MCU 38 and communication system 30 including, without limitation, bandwidth, DSP resources, and/or communication ports.

The multipoint conference may be a Meet Me Conference call. A Meet Me Conference call is an arrangement by which a user can dial a specific, predetermined telephone number and enter a security access code to join a conference with other participants. The user is automatically connected to the conference through a conference bridge. Conference participants may call in at a preset time or may be directed to do so by a conference coordinator. Meet Me Conferences may be set up through a teleconferencing service provider, generally with the capability to conference thousands of participants in a single conference call. However, other types of multipoint conferences may be accommodated, within the teachings of the present invention.

Endpoints 32–35 may be any combination of hardware, software, and/or encoded logic that provide communication services to a user. For example, endpoints 32–35 may include a telephone, a computer running telephony software, a video monitor, a camera, or any other communication hardware, software, and/or encoded logic that supports the communication of packets of media using communication network 40. In the illustrated embodiment, endpoints 32–35 include an internet telephone, a personal computer and wireless handsets, respectively. A wireless transmitter/receiver 36 couples endpoints 34 with communication network 40. Endpoints 32–35 may also include unattended or automated systems, gateways, other intermediate components, or other devices that can establish media sessions. Although FIG. 1 illustrates four endpoints 32–35, communication system 30 contemplates any number and arrangement of endpoints 32–35 for communicating media. For example, the described technologies and techniques for establishing a communication session between or among endpoints 32–35 may be operable to establish a multipoint conference between more than two endpoints 32–35.

MCU 38 may include any bridging or switching device used in support of multipoint conferencing, including videoconferencing. In various embodiments, MCU 38 may include hardware, software, and/or embedded logic. MCU 38 may be configured to support more than twenty-eight conference endpoints, simultaneously. MCU 38 may be in the form of customer provided equipment (CPE, e.g., beyond the network interface) or may be embedded in a wide area network (WAN). Exemplary multipoint conference unit standards are defined in ITU-T H.323, with T.120 describing generic conference control functions.

Communication network 40 may be any computer or communication network capable of coupling two or more endpoints 32–35, for communication. In the illustrated embodiment, communication network 40 is a wide area network (WAN) that enables communication between a plurality of endpoints distributed across multiple cities and geographic regions and communication network 41 is a public switched telephone network (PSTN). However, communication networks 40 and/or 41 may be one or more networks, including the Internet, the public switched telephone network, local area networks (LANs), global distributed networks such as intranets, extranets, or other form of wireless or wireline communication networks. Generally, communication networks 40 and 41 provide for the communication of packets, cells, frames, or other portions of information (generally referred to as packets) between and among endpoints 32–35.

Communication network 40 includes a plurality of segments 60 and nodes 61 that couple endpoints 32–35 across communication network 40. Nodes 61 may include any combination of routers, hubs, switches, gateways (e.g. gateway 42) or other hardware, software, or embedded logic implementing any number of communication protocols that allow for the exchange of packets in communication system 30. Each segment 60 and the respective nodes 61 or other communication devices it couples include a finite capacity of network resources (e.g. bandwidth) available to a communication session between endpoints. At any given time, a portion of such network resources may be dedicated to one or more communication sessions and less than the entire capacity of network resources may be available for a multipoint conference(s).

In a particular embodiment, communication network 40 employs communication protocols that allow for the addressing or identification of endpoints 32–35 coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast, or other techniques for exchanging media packets among components in communication system 30.

During any given communication session between endpoint 32, for example, and MCU 38, various communication paths are available for communicating data and information. Each communication path comprises a plurality of segments 60 and/or nodes 61. The particular communication path of a communication session depends, at least in part, upon network traffic being experienced by communication network 40 at the time of the communication session, the type of communication session, the bandwidth capacity of each segment 60 and/or node 61 included in the communication path, as well as the amount of bandwidth currently available to such segments 60 and nodes 61. Since each communication path includes a plurality of segments 60, the segment 60 having the least amount of bandwidth currently available will determine the overall capacity of a particular communication path. In accordance with a particular embodiment of the present invention, bandwidth associated with particular segments 60 and/or nodes 61 may be reserved for use during a future multipoint conference.

As previously described, MCU 38 includes a finite number of communication ports 50–55, and DSPs 46–48. Each communication port 50–55 allows MCU 38 to include at least one endpoint in a multipoint conference. DSPs 46–48 include a predetermined quantity of processing power for use during the multipoint conference. Therefore, the number of endpoints 32–35, and the amount of data and/or information exchanged during a particular multipoint conference may be constrained by the quantity or quality of DSP resources associated with DSPs 46–48. In order to accommodate a future multipoint conference, MCU 38 may be configured to reserve a predetermined number of communication ports 50–55 and/or DSP resources for the conference. In an alternative embodiment, processing capacity for the multipoint conference may be used from digital signal processor farm 43 in addition to or in lieu of DSPS 46–48.

In the illustrated embodiment, MCU 38 includes a processor 62 and memory 64. Processor 62 may be a microprocessor, controller, or any other suitable computing device or resource. Memory 64 may be any form of volatile or nonvolatile memory including, without limitation, magnetic media, optical media, random access memory (RAM), read only memory (ROM), removable media, or any other suitable local or remote memory component. A user of communication system 30 may configure MCU 38 to accommodate a future multipoint conference, using processor 62 and memory 64. When a user or network administrator schedules a multipoint conference, MCU 38 prompts the administrator to identify the number of participants and a unique identifier associated with each participant. MCU 38 uses this information to predict a communication path for each participant, and reserve sufficient communication ports, DSP resources, bandwidth and/or other network resources to support the multipoint conference.

FIG. 2 illustrates a method for reserving conference resources for a multipoint conference, in accordance with a particular embodiment of the present invention. The method begins at step 100 where information regarding the multipoint conference is received. The information may include a scheduled start time for the conference and an estimated duration. The type of multipoint conference may also be specified, for example a video, or audio conference, as well as the amount and/or type of data and information to be communicated. The administrator may also specify the amount of bandwidth or quality of service (QoS) desired for the multipoint conference. This allows the system to determine the amount of DSP resources, communication ports, and bandwidth required for the multipoint conference.

At step 102, a list of participants is received from the multipoint conference administrator. Each participant is identified with a unique identifier which may include the participant's name, user name, email address, telephone number and/or other unique alphanumeric identifier. The unique identifier allows the system to identify the participants and predict the physical and/or logical address of the endpoint (e.g. IP address) from which each participant will access MCU 38. The administrator may input the name of each participant. This allows the system to access a database, for example memory 64, which includes at least one IP address associated with the participant. Each participant may have more than one IP address associated with their name or unique identifier.

If one or more participants have more than one IP address associated with their user profile, the system predicts which IP address will be used for the particular multipoint conference. In accordance with a particular embodiment, processor 62 is operable to access memory 64 to establish the IP address for each participant, and to predict the communication path for each participant.

The IP address predicted for a particular participant may be time-dependent. For example, if the conference is scheduled to take place during working hours, an IP address associated with each participant's office telephone may be used. Alternatively, if the conference is scheduled to occur after hours, an IP address associated with each participant's home may be used. The database may include a user profile for each participant regarding which IP address that participant will most likely use at any given time.

In another embodiment, the system may transmit a message to each participant requesting each participant to specify the IP address that the participant intends to use for the particular multipoint conference. This message may be sent via electronic mail. In another embodiment, the message may be sent via a web form. The system collects information from the response of each participant in order to identify the endpoints from which each participant will access the MCU. In yet another embodiment, the administrator may enter the IP address from which each participant will access the MCU. In this embodiment, it is the responsibility of the administrator to collect the IP address associated with each participant for input into the system.

At step 104, the system predicts the communication path each participant will use, based upon their IP address. In order to predict these communication paths, the system uses IP addresses associated with the predicted endpoints and MCU 38. MCU 38 may also use a "trace route" or equivalent message to determine which communication path will be used to couple a particular endpoint with MCU 38. The trace route includes a message, or packet of info sent from MCU 38 to the endpoint. The predicted communication path associated with each participant will depend, at least in part, upon the network that each participant will use to access the MCU, the amount of required bandwidth, the capacity of bandwidth associated with segments of the communication path, and/or the amount of bandwidth available at the start time, and for the estimated duration of the multipoint conference.

Subjective and/or objective analysis may be performed by MCU 38 to determine the optimal selection of communication paths for each endpoint 32–35 to access MCU 38, based upon the specification(s) of endpoints 32–35, MCU 38, and/or other components of communication network 40. The optimal communication path may also depend, at least in part, upon the availability of network resources or parameters, including available bandwidth, network congestion and/or a predetermined QoS recommendation.

Using this information, the system reserves bandwidth along each predicted communication path at step 106. The amount of bandwidth reserved is determined, at least in part, from the information received at steps 100, 102 and the predicted communication paths of step 104. The reserved bandwidth is identified as unavailable to other users of the network from the anticipated start time, and for the estimated duration of the multipoint conference. Bandwidth reservations may be made both ways along the communication path. For example, bandwidth may be reserved along the communication path from endpoint 32 to MCU 38, and from MCU 38 to endpoint 32. The teachings of the present invention may be used to reserve various network resources, including bandwidth, in the manner described herein.

Finally, at step 108, the system reserves MCU resources required for the multipoint conference. MCU resources may include communication ports and DSP resources appropriate for conducting the multipoint conference. The reserved MCU resources are then indicated as unavailable for other users of communication system 30 for a predetermined time period beginning at approximately the estimated start time, and extending for the estimated duration of the multipoint conference. For the purposes of this specification, DSP resources may include processing capacity associated with a digital signal processor, a general purpose high performance central processing unit, or other suitable hardware component.

The reservation of MCU resources ensures that MCU 38 will have sufficient resources available to accommodate the multipoint conference. By combining this with network resource reservations (e.g. bandwidth), each participant is ensured that not only will the MCU be available, but that network resources sufficient for the participant to access the MCU will be available.

A database, for example database 64, may be used to store information about reserved network and/or MCU resources reserved for a multipoint conference. Such information may include a session identification, port number of the MCU, amount of bandwidth reserved and identification numbers for the requester and each participant. The identifier may be an IP address, TCP port number and/or UDP port number. Each session may also include the anticipated or actual start, duration and end time for the conference, as well as a preselected or computed QoS requirement.

Figure 3:
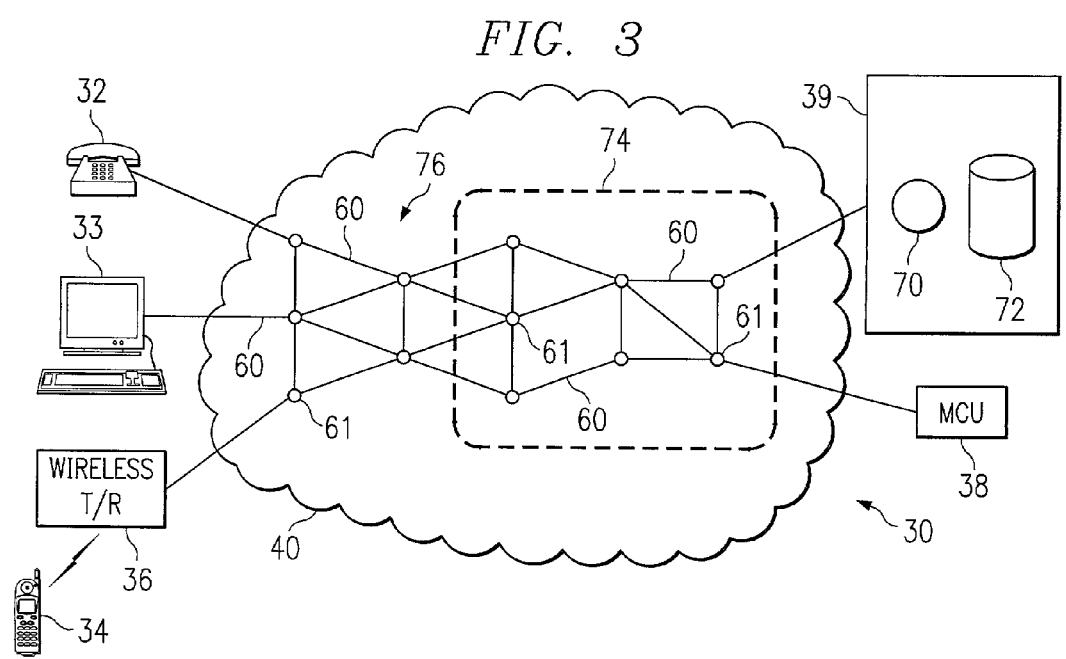
FIG. 3 illustrates another embodiment of the communication system of FIG. 1, including a policy server that controls and coordinates the distribution of network resources for multipoint conferences.

FIG. 3 illustrates communication system 30, which now includes a policy server 39, coupled with communication network 40. Policy server 39 includes a processor 70 and memory 72. In various embodiments, processor 70 and memory 72 may include components and functionality identical to those discussed with regard to processor 62 and memory 64 of MCU 38. Policy server 39 is operable to allocate conference resources including, without limitation, bandwidth to participants and endpoints associated with multipoint conferences. For example, policy server 39 performs decision making regarding which multipoint conference(s) receives priority over others when, for example, there are insufficient network resources to accommodate all scheduled and/or requested multipoint conferences. Similarly, policy server 39 is operable to determine which participants and/or endpoints to accommodate with network resource reservations, particularly when policy server 39 determines that it is likely that less than all can be accommodated. In the illustrated embodiment, policy server 39 manages and allocates all of the bandwidth in the network, and makes all bandwidth allocation decisions for all nodes 61.

Network 40 includes a core network 74 and peripheral networks 76. Core network 74 includes the network backbone and infrastructure of communication network 40, and may include a local network that MCU 38 and policy server 39 are coupled with, for example a LAN or a metropolitan area network (MAN). A network administrator responsible for the operation of MCU 38 and/or policy server 39 will typically have the ability to exercise control over some or all of the network resources associated with communication network 40. Core network 74 is intended to include all such resources. Peripheral network 76 includes all other networks and components which are coupled with and/or integral to communication network 40. In accordance with various embodiments of the present invention, different types of reservations may be made at the core network 74 and the peripheral network 76.

At the peripheral network (e.g. LAN), for example, reservations may be made before they are needed, and held until the conference begins. In other words, at the time the reservation for network resources is received, the network resources are reserved from that point in time, until approximately the anticipated start (or finish) time for the multipoint conference. Accordingly, other users of communication network 40 will not have access to such network resources from the time the reservation is made, until the end time of the reservation. Typically, the periphery network will include sufficient network resources available for all participants to access the MCU. However, if this is not the case, reservations may be made at the periphery network in a similar manner as the core network reservations described below.

Gateway resources (e.g., ports) associated with gateway 42 (FIG. 1) may also be reserved to accommodate a multipoint conference, similar to the reservation of network and MCU resources described herein. Similarly, DSP resources associated with DSP farm 43 may be reserved for the multipoint conference.

The reservations associated with the core or peripheral network may be communicated and processed using the resource reservation protocol (RSVP). RSVP is a transport-layer protocol that is intended to provide QoS transmission levels in conjunction with TCP/IP over the Internet. The RSVP protocol makes the sender of data responsible for notifying the receiver that a call is to be made (or data to be sent) and what QoS will be needed. The responsibility for selecting the resources or path by which the transmission will take is given to the receiver or called party. RSVP may be used to provide immediate, real-time reservations of network resources.

RSVP allows channels or communication paths on a network to be reserved in real-time, for a multicast (one source to many receivers) transmission of video and other high-bandwidth transmissions. RSVP enables network applications to obtain special QoSs for their data flows. RSVP works in conjunction with routing protocols and installs the equivalent of dynamic access lists along the routes that routing protocols calculate. It occupies the place of a transport protocol in the OSI model seven-layer protocol stack.

At the network core, a predetermined number of reservations (pool) appropriate to handle the multipoint conference may be made together by the network administrator or authorized user. This ensures the availability of such network resources at the time of the multipoint conference. This reservation pool may be configured to expire at the anticipated start (or finish) time of the multipoint conference. Alternatively, the reservation pool may be set to expire ahead of the start time of the multipoint conference, to the extent that individual participants have not "confirmed" their reservations. Therefore, any unused or potentially unnecessary network resource reservations may be taken away from the multipoint conference and allocated to other users and/or network components.

Reservations are distributed from this pool as individual reservations are received from the endpoints. In other words, an administrator reserves a pool of network resources for the multipoint conference which are allocated to particular participants, as each participant confirms their intent to participate in the multipoint conference. Network resources over and above those appropriate to service all confirmed participants are released to other network users. The expiration of the reservation may be scheduled for several days after each participant receives their invitation, or a few days before, or at the beginning of the multipoint conference. In this manner, network resource reservations for participants who do not intend to participate are not unnecessarily maintained, and other network users are free to use such network resources.

Decisions as to which multipoint conference(s) reservations to accommodate, and the quantity of network resources available to the multipoint conference(s) are made by policy server 39. Similarly, decisions as to which individual reservations to accommodate, and the quantity of network resources (e.g., bandwidth) to allocate to each reservation is made by the policy server. In accordance with a particular embodiment of the present invention, the policy server reserves a predetermined amount of bandwidth which is dedicated to "high-priority" reservations. All multipoint conferences may be designated as high priority, and multipoint conference reservations may be allocated from this high-priority pool of bandwidth. Accordingly, multipoint conference reservations are afforded a higher priority than other communication sessions associated with communication network 40. Therefore, a predetermined amount of bandwidth may be made available to multipoint conferences only, or other particular types of high priority communication sessions may receive high priority status and receive bandwidth from the high priority pool.

In another embodiment, a scheduling algorithm may be incorporated into policy server 39. Policy server 39 maintains a schedule of each multipoint conference, and the amount of bandwidth required for all participants. At a predetermined amount of time before the multipoint conference is scheduled to begin (e.g., minutes, hours, days ahead of time), the policy server pre-allocates a predetermined amount of bandwidth for the multipoint conference. Pre-allocating bandwidth ahead of the scheduled start time ensures that sufficient bandwidth will be available at the start of the multipoint conference, and for the entire duration.

In accordance with yet another embodiment, no pre-allocation of bandwidth is accomplished prior to the start of the multipoint conference. Instead, when the conference is due to begin, policy server 39 attempts to allocate enough bandwidth to accommodate the multipoint conference. If sufficient network resources are not available, lower priority reservations are not accommodated. Accordingly, policy server 39 is pre-configured to prioritize endpoints and/or participants in order to determine which endpoints to accommodate.

MCU 38 and/or policy server 39 may also be configured to access the availability and capacity of all network components and determine the most appropriate resources to use for a particular multipoint conference. For example, if MCU 38 or policy server 39 determines that sufficient bandwidth between the calling endpoint and the MCU will not be available at the requested time in the future, they may attempt to find other network resources of communication network 40 to secure the network resource reservations to accommodate the upcoming multipoint conference. Similarly, if policy server 39 or MCU 38 determines that MCU 38 does not have sufficient communication ports and/or DSP resources available to accommodate the future multipoint conference, they may attempt to identify another MCU within or coupled with communication network 40 that has sufficient available capacity.

FIG. 4 illustrates a flowchart of a method for reserving MCU and network resources for a multipoint conference. The method begins at step 200 where a request for a multipoint conference reservation is received. The request may include information regarding the start time, duration, end time, number and identity of participants, and type of multipoint conference. The request may also include QoS requirements for the multipoint conference. Alternatively, the QoS requirements may be derived from the type of multipoint conference requested.

The predicted communication path for each participant is determined at step 202. The communication paths may be predicted as previously discussed, for example, with regard to FIG. 2. Alternatively, communication paths from MCU 38 to the endpoints may be precomputed using RSVP PATH messages, and network resource reservations may be acquired in advance for those communication paths which travel through the network core.

RSVP PATH messages are sent by each sender of data along unicast or multicast routes provided by routing protocols. The path message is used to store the path state in each node. The path state is used to route reservation-request messages in the reverse direction.

At step 204, an estimate of MCU resources required for the multipoint conference is established. MCU resources may include DSP resources and/or communication ports associated with an MCU. The amount of MCU resources required will depend, at least in part, upon the number of participants, type of multipoint conference, and/or requested QoS.

At step 206, the system determines whether MCU resources are available within the network to accommodate the multipoint conference. If there are insufficient MCU resources available for the scheduled time, the system prompts the conference coordinator to select another scheduled time, at step 208. If MCU resources are available, the system investigates the availability of network resources, to accommodate the communication paths associated with each participant.

A participant is selected at step 210, in order to verify the availability of network resources along the communication path associated with that participant. The order in which network resources are verified regarding each participant may proceed according to the order in which each participant is input by the multipoint conference coordinator. Alternatively, other criteria may be used. For example, high priority participant's communication paths may be checked first, or communication paths which are least likely to have sufficient available resources may be checked first. At step 212, the system determines whether network resources are available for the selected participant(s). Network resources may include bandwidth, switching capacity or other components necessary to accommodate the multipoint conference as well as any specified or necessary QoS.

If insufficient resources are available to accommodate the selected participant, the system selects another MCU to accommodate the multipoint conference, at step 214. If another MCU is selected, the method returns to step 206 in order to determine if sufficient MCU resources are available at the selected MCU. However, if sufficient network resources are available to accommodate the selected participant, the system determines whether additional participants remain for network resource verification, at step 216.

If more participants remain for communication path verification, the next participant is selected, at step 218. The method returns to step 212, to verify the sufficiency of network resources available to accommodate this next selected participant. The method continues in this manner, until network resources for each communication path associated with each participant is verified. If sufficient network resources are available for each participant, the reservations are confirmed at step 220.

FIG. 5 illustrates a table, indicated generally by the reference numeral 300, maintaining session information regarding a plurality of multipoint conferences, and associated conference resource reservations. Some or all of the session information of table 300 may be stored, maintained, accessed and/or manipulated by MCU 38, policy server 39, and/or other components coupled with network 40.

Table 300 includes a session identification (ID) entry 302. For illustrative purposes, three sessions are illustrated and designated N, N+1, and N+2. Each session 304–306 includes an associated MCU address 308. The MCU address identifies the IP address of the MCU selected to host the multipoint conference. MCU entry address 308 also includes an indication of the number of ports, and the quantity of DSP resources reserved for each multipoint conference.

The requester ID entry 310 identifies the conference coordinator, or the individual who arranged the multipoint conference. As previously discussed, the requester ID may be used to prioritize multipoint conferences, in order to determine which multipoint conferences will be accommodated if less than all requested conferences may be accommodated by a particular MCU.

The participants selected for each multipoint conference are identified at 312. For example, conference N includes five potential participants, each being identified by a unique identifier. In the illustrated embodiment of FIG. 5, the unique identifiers include each participant's IP address. A user ID may also be used to identify each participant. The user ID may be resolved using an address resolution service or using a directory.

Entry 314 identifies a priority associated with each participant, and also indicates whether the participant has confirmed that they will participate in the multipoint conference. The priority associated with each participant may be used to determine the order in which conference resource reservations will be accommodated and/or which conference resources will be accommodated when less than all reservations may be accommodated.

The scheduled start and end time for each multipoint conference are identified at 316 and 318, respectively. The type of conference is identified at 320. In a mixed conference, the type may vary per port. For example, one or more participants may receive audio and video signals, and others may receive audio only. The requested quality of service (QoS) is identified at 322. In the illustrated embodiment, the QoS is a bitmap field with numerous subfields which identify various attributes (e.g., latency, reliability, preemption. Each subfield can have a value of zero or one (ON or OFF).

The quantity of bandwidth desired for reservation along the communication path from each participant to the MCU is identified at 324. Finally, entry 326 indicates whether or not the bandwidth has been reserved.

As previously discussed, each of MCU 38, policy server 39 and/or functionality described herein may be implemented in hardware, software, and/or embedded logic. Such components, hardware, software and/or embedded logic may be implemented centrally or distributed throughout the network. Similarly, components of MCU 38 and policy server 39 may be located centrally, or physically (and/or logically) separated within the network.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for reserving a network resource for a multipoint conference, comprising:
    receiving a list of participants scheduled to participate in a conference;
    receiving a scheduled start time and estimated duration for the conference;
    predicting a plurality of communication paths, each communication path corresponding to at least one of the participants;
    reserving the network resource along the communication paths for a predetermined period of time beginning at approximately the scheduled start time;
    wherein the network resource comprises bandwidth; and
    receiving an address of a host multipoint control unit and wherein the plurality of communication paths include the address.

2. The method of claim 1, wherein the multipoint control unit includes digital signal processor resources and further comprising reserving at least a portion of the digital signal processor resources for a predetermined period of time beginning at approximately the scheduled start time.

3. The method of claim 1, wherein the multipoint control unit includes a plurality of communication ports and further comprising reserving a number of the plurality of communication ports for a predetermined period of time beginning at approximately the scheduled start time.

4. A method for reserving a network resource for a multipoint conference, comprising:
    receiving a list of participants scheduled to participate in a conference;
    receiving a scheduled start time and estimated duration for the conference;
    predicting a plurality of communication paths, each communication path corresponding to at least one of the participants;
    reserving the network resource along the communication paths for a predetermined period of time beginning at approximately the scheduled start time; and
    receiving a plurality of participant addresses, each participant address corresponding to at least one of the participants and wherein each participant address comprises an endpoint of at least one communication path.

5. The method of claim 4, wherein the participant address comprises an Internet Protocol (IP) address.

6. A method for reserving a network resource for a multipoint conference, comprising:
    receiving a list of participants scheduled to participate in a conference;
    receiving a scheduled start time and estimated duration for the conference;
    predicting a plurality of communication paths, each communication path corresponding to at least one of the participants;
    reserving the network resource along the communication paths for a predetermined period of time beginning at approximately the scheduled start time; and
    predicting at least one of the plurality of communication paths using a default address associated with at least one of the participants.

7. The method of claim 6, wherein the default address is dependent, at least in part, upon the scheduled start time of the conference.

8. A method for reserving a network resource for a multipoint conference, comprising:
- receiving a list of participants scheduled to participate in a conference;
- receiving a scheduled start time and estimated duration for the conference;
- predicting a plurality of communication paths, each communication path corresponding to at least one of the participants;
- reserving the network resource along the communication paths for a predetermined period of time beginning at approximately the scheduled start time; and
- transmitting a message to at least one of the plurality of participants, the message including a request to the participant to provide an address from which the participant intends to participate in the multipoint conference.

9. The method of claim 8, further comprising transmitting the message to the participant via electronic mail.

10. The method of claim 8, further comprising transmitting the message to the participant via a web form.

11. An apparatus for reserving a network resource for a multipoint conference, comprising:
- a processor operable to receive a scheduled start time and estimated duration for the conference and a list of participants;
- the processor being further operable to predict a plurality of communication paths associated with the plurality of participants, and reserve the network resource along at least one of the communication paths; and
- wherein the processor is further operable to reserve a plurality of ports of a gateway for a predetermined period of time, beginning at approximately the scheduled start time.

12. Logic encoded in media for reserving a network resource for a multipoint conference, the logic operable to perform the following steps:
- receiving a list of participants scheduled to participate in the conference;
- receiving a scheduled start time and estimated duration for the conference;
- predicting a plurality of communication paths, each communication path corresponding to at least one of the participants;
- reserving the network resource along the communication paths for a predetermined period of time beginning at approximately the scheduled start time;
- wherein the network resource comprises bandwidth; and
- wherein the multipoint control unit includes digital signal processor resources, and further comprising reserving at least a portion of the digital signal processor resources for a predetermined period of time beginning approximately the scheduled start time.

13. Logic encoded in media for reserving a network resource for a multipoint conference, the logic operable to perform the following steps:
- receiving a list of participants scheduled to participate in the conference;
- receiving a scheduled start time and estimated duration for the conference;
- predicting a plurality of communication paths, each communication path corresponding to at least one of the participants;
- reserving the network resource along the communication paths for a predetermined period of time beginning at approximately the scheduled start time;
- wherein the network resource comprises bandwidth; and
- wherein the multipoint control unit includes a plurality of communication ports, and further comprising reserving a number of the plurality of communication ports for a predetermined period of time, beginning at approximately the scheduled start time.

14. Logic encoded in media for reserving a network resource for a multipoint conference, the logic operable to perform the following steps:
- receiving a list of participants scheduled to participate in the conference;
- receiving a scheduled start time and estimated duration for the conference;
- predicting a plurality of communication paths, each communication path corresponding to at least one of the participants;
- reserving the network resource along the communication paths for a predetermined period of time beginning at approximately the scheduled start time; and
- receiving a plurality of participant addresses, each participant address corresponding to at least one of the participants, and wherein each participant address comprises and end point of at least one communication path.

15. Logic encoded in media for reserving a network resource for a multipoint conference, the logic operable to perform the following steps:
- receiving a list of participants scheduled to participate in the conference;
- receiving a scheduled start time and estimated duration for the conference;
- predicting a plurality of communication paths, each communication path corresponding to at least one of the participants;
- reserving the network resource along the communication paths for a predetermined period of time beginning at approximately the scheduled start time; and
- predicting at least one of the plurality of communication paths using a default address associated with at least one of the participants.

16. Logic encoded in media for reserving a network resource for a multipoint conference, the logic operable to perform the following steps:
- receiving a list of participants scheduled to participate in the conference;
- receiving a scheduled start time and estimated duration for the conference;
- predicting a plurality of communication paths, each communication path corresponding to at least one of the participants;
- reserving the network resource along the communication paths for a predetermined period of time beginning at approximately the scheduled start time; and
- transmitting a message to at least one of the plurality of participants, the message including a request to provide an address from which the participant intends to participate in the multipoint conference.

17. An apparatus for reserving a network resource for a multipoint conference, comprising:
- means for receiving a list of participants scheduled to participate in the conference;
- means for receiving a scheduled start time and estimated duration for the conference;
- means for predicting a plurality of communication paths, each communication path corresponding to at least one of the participants;

means for reserving the network resource along the communication paths for a predetermined period of time beginning at approximately the scheduled start time; and means for reserving at least a portion of digital signal processor resources for a predetermined period of time beginning at approximately the scheduled start time.

18. An apparatus for reserving a network resource for a multipoint conference, comprising:

means for receiving a list of participants scheduled to participate in the conference;

means for receiving a scheduled start time and estimated duration for the conference;

means for predicting a plurality of communication paths, each communication path corresponding to at least one of the participants;

means for reserving the network resource along the communication paths for a predetermined period of time beginning at approximately the scheduled start time; and means for reserving a number of communication ports for a predetermined period of time beginning at approximately the scheduled start time.

19. An apparatus for reserving a network resource for a multipoint conference, comprising:

means for receiving a list of participants scheduled to participate in the conference;

means for receiving a scheduled start time and estimated duration for the conference;

means for predicting a plurality of communication paths, each communication path corresponding to at least one of the participants;

means for reserving the network resource along the communication paths for a predetermined period of time beginning at approximately the scheduled start time; and means for receiving a plurality of participant addresses, each participant address corresponding to at least one of the participants, and wherein each participant address comprises an end point of at least one communication path.

20. An apparatus for reserving a network resource for a multipoint conference, comprising:

means for receiving a list of participants scheduled to participate in the conference;

means for receiving a scheduled start time and estimated duration for the conference;

means for predicting a plurality of communication paths, each communication path corresponding to at least one of the participants;

means for reserving the network resource along the communication paths for a predetermined period of time beginning at approximately the scheduled start time; and means for predicting at least one of the plurality of communication paths using a default address associated with at least one of the participants.

21. An apparatus for reserving a network resource for a multipoint conference, comprising:

means for receiving a list of participants scheduled to participate in the conference;

means for receiving a scheduled start time and estimated duration for the conference;

means for predicting a plurality of communication paths, each communication path corresponding to at least one of the participants;

means for reserving the network resource along the communication paths for a predetermined period of time beginning at approximately the scheduled start time; and means for transmitting a message to at least one of the plurality of participants, the message including a request to provide an address from which the participant intends to participate in the multipoint conference.

* * * * *